US008693021B2

(12) United States Patent
Sampath et al.

(10) Patent No.: US 8,693,021 B2
(45) Date of Patent: Apr. 8, 2014

(54) PREEMPTIVE REDIRECTION IN PRINTING SYSTEMS

(75) Inventors: Meera Sampath, Chennai (IN); Stan Alan Spencer, Sherwood, OR (US); Rajinderjeet Singh Minhas, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 1739 days.

(21) Appl. No.: 11/656,992

(22) Filed: Jan. 23, 2007

(65) Prior Publication Data

US 2008/0174802 A1 Jul. 24, 2008

(51) Int. Cl.
- G06K 15/00 (2006.01)
- G06F 3/12 (2006.01)
- H04N 1/40 (2006.01)
- H04N 1/00 (2006.01)

(52) U.S. Cl.
USPC ....... 358/1.14; 358/1.12; 358/1.13; 358/3.05; 358/426.09; 714/100; 713/300; 713/340; 713/322

(58) Field of Classification Search
USPC ................ 358/426, 426.09, 1.12–1.14, 3.05; 714/100; 713/300, 340, 322
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,150,167 A * | 9/1992 | Gonda et al. ............... 399/16 |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

Primary Examiner — Firmin Backer
Assistant Examiner — Jonathan Beckley
(74) Attorney, Agent, or Firm — Fay Sharpe LLP

(57) ABSTRACT

Described herein is a printing system including a plurality of print processing modules which can selectively transfer print media there between during printing. The system further including a controller that can predict the impending unhealthy state of at least one module and redirect one of an unprocessed job and a partially processed job preemptively from an impending unhealthy module to selectively one of a healthy module and another unhealthy module, with suitable characteristics, to process unprocessed portions of the job.

17 Claims, 3 Drawing Sheets

(56) References Cited

U.S. PATENT DOCUMENTS

| | | | |
|---|---|---|---|
| 5,778,377 A | 7/1998 | Marlin et al. | |
| 5,884,910 A | 3/1999 | Mandel | |
| 5,923,834 A * | 7/1999 | Thieret et al. | 714/25 |
| 5,963,770 A * | 10/1999 | Eakin | 399/364 |
| 5,995,721 A | 11/1999 | Rourke et al. | |
| 6,059,284 A | 5/2000 | Wolf et al. | |
| 6,125,248 A | 9/2000 | Moser | |
| 6,241,242 B1 | 6/2001 | Munro | |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,652,169 B2 * | 11/2003 | Parry | 400/74 |
| 6,707,563 B1 * | 3/2004 | Barry et al. | 358/1.14 |
| 6,786,149 B1 * | 9/2004 | Lomoine et al. | 101/223 |
| 6,791,704 B1 * | 9/2004 | Moreau et al. | 358/1.15 |
| 6,817,792 B2 * | 11/2004 | Parry | 400/74 |
| 6,819,906 B1 | 11/2004 | Herrmann et al. | |
| 6,892,317 B1 * | 5/2005 | Sampath et al. | 714/4 |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 7,110,917 B2 * | 9/2006 | Matsuura et al. | 702/185 |
| 7,123,873 B2 | 10/2006 | deJong et al. | |
| 7,203,431 B2 * | 4/2007 | Shoji et al. | 399/9 |
| 7,206,082 B2 * | 4/2007 | Barry et al. | 358/1.13 |
| 7,243,270 B2 * | 7/2007 | Taniguchi et al. | 714/44 |
| 7,301,665 B2 * | 11/2007 | Barry et al. | 358/1.15 |
| 7,342,686 B2 * | 3/2008 | Barry et al. | 358/1.9 |
| 7,483,159 B2 * | 1/2009 | Tokutomo et al. | |
| 7,554,574 B2 * | 6/2009 | Shoji et al. | 348/207.99 |
| 7,711,808 B2 * | 5/2010 | Parry | 709/224 |
| 2002/0067494 A1 * | 6/2002 | Furuya | 358/1.9 |
| 2002/0078012 A1 | 6/2002 | Ryan et al. | |
| 2002/0103559 A1 | 8/2002 | Gartstein | |
| 2002/0105668 A1 * | 8/2002 | Lilland et al. | 358/1.14 |
| 2003/0002881 A1 * | 1/2003 | Hirose et al. | 399/44 |
| 2003/0077095 A1 | 4/2003 | Conrow | |
| 2003/0227646 A1 * | 12/2003 | Barrett | 358/1.14 |
| 2003/0231332 A1 * | 12/2003 | Barrett | 358/1.14 |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0002054 A1 * | 1/2005 | Shoji et al. | 358/1.14 |
| 2005/0068557 A1 * | 3/2005 | Patton et al. | 358/1.13 |
| 2005/0141013 A1 * | 6/2005 | Kikuchi et al. | 358/1.14 |
| 2006/0033771 A1 | 2/2006 | Lofthus et al. | |
| 2006/0066885 A1 | 3/2006 | Anderson et al. | |
| 2006/0067756 A1 | 3/2006 | Anderson et al. | |
| 2006/0067757 A1 | 3/2006 | Anderson et al. | |
| 2006/0114313 A1 | 6/2006 | Moore | |
| 2006/0114497 A1 | 6/2006 | Anderson et al. | |
| 2006/0115284 A1 | 6/2006 | Grace et al. | |
| 2006/0115287 A1 | 6/2006 | Roof | |
| 2006/0115288 A1 | 6/2006 | Roof | |
| 2006/0132815 A1 | 6/2006 | Lofthus et al. | |
| 2006/0176336 A1 | 8/2006 | Moore et al. | |
| 2006/0197966 A1 | 9/2006 | Viturro et al. | |
| 2006/0209101 A1 | 9/2006 | Mizes | |
| 2006/0214359 A1 | 9/2006 | Clark | |
| 2006/0214364 A1 | 9/2006 | Clark et al. | |
| 2006/0215240 A1 | 9/2006 | Mongeon | |
| 2006/0221159 A1 | 10/2006 | Moore et al. | |
| 2006/0221362 A1 | 10/2006 | Julien et al. | |
| 2006/0222378 A1 | 10/2006 | Julien | |
| 2006/0222384 A1 | 10/2006 | Moore et al. | |
| 2006/0222393 A1 | 10/2006 | de Jong et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0233569 A1 | 10/2006 | Furst et al. | |
| 2006/0235547 A1 | 10/2006 | Hindi et al. | |
| 2006/0238778 A1 | 10/2006 | Mongeon et al. | |
| 2006/0244980 A1 | 11/2006 | Grace | |
| 2006/0250636 A1 | 11/2006 | Richards | |
| 2007/0002085 A1 * | 1/2007 | Sampath et al. | 347/5 |
| 2007/0195351 A1 * | 8/2007 | Mashtare et al. | 358/1.13 |
| 2008/0137110 A1 * | 6/2008 | Mestha et al. | 358/1.9 |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.

(56) References Cited

OTHER PUBLICATIONS

U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/545,176, filed Oct. 10, 2006, deJong et al.
U.S. Appl. No. 11/595,630, filed Nov. 9, 2006, Moore.
U.S. Appl. No. 11/590,432, filed Oct. 31, 2006, Moore.

\* cited by examiner

PREEMPTIVE REDIRECTION IN PRINTING SYSTEMS

BACKGROUND

The following relates to printing systems. It finds particular application to fault prediction and preemptive redirection of jobs by determining the impending unhealthy state of printing system components and accordingly leveraging alternate resources available to process and partially process jobs.

In a typical xerographic system, such as a copying or printing device, an electronic image is transferred to a print medium, such as paper, plastic, velum and the like. In a xerophotographic process, a photoconductive insulating member is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with developing powder referred to in the art as toner. This image may be transferred to a support surface, such as paper, to which the toner image is permanently affixed in a fusing process.

In a multicolor electrophotographic process, successive latent images corresponding to different colors are formed on the insulating member and developed with a respective toner. Each single color toner image is transferred to the paper sheet in superimposed registration with the prior toner image. For simplex printing, only one side of a sheet is printed, while for duplex printing, both sides are printed. Other printing processes are known in which the electronic signal is reproduced as an image on a sheet by other means, such as through impact (e.g., a type system or a wire dot system), or through use of a thermosensitive system, ink jets, laser beams, or the like.

A conventional approach to increasing printing throughput is to increase the speed of the printer. However, increasing printer speed typically results in greater stress on the individual components of the printer. Another approach is to employ several marking engines, which can be vertically and/or horizontally stacked, within a printing platform. Multiple marking engine systems provide relatively higher overall output by parallel printing processes, wherein portions of the same document are printed on multiple printers or concurrently processing multiple print jobs. For example, an electronic print job that includes color and monochrome portions may be partitioned and distributed across color and monochrome printers. Print media substrate (e.g., paper, velum, plastic . . . ) is fed from a common or different source to the printers. Printed substrate is conveyed to a finisher where the media associated with a single print job are assembled. Such systems are commonly referred to as "tandem engine" printers, "integrated parallel" printers, or "cluster printing" printers.

In a conventional single engine system, a faulty print engine typically is disabled, which shuts the system down. During periods of down time, print jobs are delayed, which results in customer annoyance, decreased customer utility, and loss in revenue. This problem is exacerbated when considered in light of a population of printing platforms. With a conventional multi-engine system, a faulty print engine typically is by-passed. Print jobs associated with the faulty print engine are re-routed to one or more non-faulty print engines. In U.S. Pat. No. 5,150,167, by Gonda, et al., and entitled "Image Forming Apparatus," print jobs are re-routed in order to maintain continuous printing operation. However, Gonda, et al. merely determines whether a printer is able to continue processing an on-going print job based on lack of paper, low toner, etc. If not, the print job is routed to another printer that is associated with a tray with paper, a cartridge with toner, etc. In addition, simply by-passing a faulty print engine reduces processing performance and overall throughput.

CROSS REFERENCE TO RELATED PATENTS AND APPLICATIONS

The following applications, the disclosures of each being totally incorporated herein by reference, are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/522,171, filed, entitled "FAULT MANAGEMENT FOR A PRINTING SYSTEM", by Meera Sampath et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,821, filed May 25, 2005, entitled "AUTOMATED PROMOTION OF MONOCHROME JOBS FOR HLC PRODUCTION PRINTERS," by David C. Robinson;

U.S. application Ser. No. 11/136,959, filed May 25, 2005, entitled "PRINTING SYSTEMS", by Kristine A. German et al.;

U.S. application Ser. No. 11/137,634, filed May 25, 2005, entitled "PRINTING SYSTEM", by Robert M. Lofthus et al.; and U.S. application Ser. No. 11/137,251, filed May 25, 2005, entitled "SCHEDULING SYSTEM", by Robert M. Lofthus et al.

U.S. application Ser. No. 11,170,845, filed Jun. 30, 2005, entitled "HIGH AVAILABILITY PRINTING SYSTEMS", BY Meera Sampath et al.

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Publication No. US-2006-0033771-A1, published Feb. 16, 2006, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. dejong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Publication No. US-2006-0176336-A1, Published Aug. 10, 2006, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BYPASS PAPER PATH," by Robert A. Clark;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Publication No. US-2006-0222378-A1, Published Oct. 5, 2006, entitled "PRINTING SYSTEM," by Paul C. Julien;

U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. dejong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0250636-A1, published Nov. 9, 2006, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 2006, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2006-0291018-A1, Published Dec. 28, 2006, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOTP PHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd F. Bean;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. application Ser. No. 11/545,176, filed Oct. 10, 2006, entitled "PRINTING SYSTEM WITH INVERTER DISPOSED FOR MEDIA VELOCITY BUFFERING AND REGISTRATION", by Joannes N. M. Dejong et al.

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/636,901, filed Dec. 11, 2006, entitled "DATA BINDING IN MULTIPLE MARKING ENGINE PRINTING SYSTEMS BACKGROUND", by Martin E. Banton et al.;

U.S. application Ser. No. 11/636,747, filed Dec. 11, 2006, entitled "METHOD AND SYSTEM FOR IDENTIFYING OPTIMAL MEDIA FOR CALIBRATION AND CONTROL", by Lalit Keshav Mestha et al.;

U.S. application Ser. No. 11/639,073, filed Dec. 14, 2006, entitled "MODULE IDENTIFICATION METHOD AND SYSTEM FOR PATH CONNECTIVITY IN MODULAR SYSTEMS", by David K. Biegelsen et al.;

U.S. application Ser. No. 11/612,908, filed Dec. 19, 2006, entitled "EXCEPTION HANDLING", by Wheller Ruml et al.;

U.S. application Ser. No. 11/642,028, filed Dec. 19, 2006, entitled "BI-DIRECTIONAL MEDIA SHEET TRANSPORT APPARATUS", by James J. Spence et al.;

U.S. application Ser. No. 11/643,119, filed Dec. 21, 2006, entitled "MEDIA FEEDER FEED RATE", by Robert A. Clark et al.;

BRIEF DESCRIPTION

According to an aspect illustrated herein, a printing system includes a plurality of print processing modules which selectively transfer print media therebetween during printing. The system further includes a controller that predicts the impending unhealthy state of at least one module and redirects one of an unprocessed job and a partially processed job preemptively from an impending unhealthy module to selectively a healthy module and another unhealthy module, with suitable capabilities to process unprocessed portions of the job.

According to another aspect illustrated herein, a method for predicting an impending unhealthy state of one or more capabilities of a printing system having a plurality of modules is described. The method including wherein the one or more capabilities representing diminished capabilities relative to the capabilities available when a module is healthy. The method further includes redirecting one of an unprocessed job and a partially processed job preemptively from an impending unhealthy module to selectively a healthy module and another unhealthy module, with suitable capabilities, to process unprocessed portions of the job.

According to still another aspect illustrated herein, a method for preemptively redirecting jobs in a printing system with multiple marking engines and multiple print media components is described. The method comprising predicting an impending unhealthy state of a marking engine and redirecting jobs from the impending unhealthy marking engine to another marking engine. The method further comprises predicting the impending state which can include tracking the rate of misfeeds and multifeeds and redirecting one of an unprocessed job and a partially processed job to selectively at least the another marking engine and from one print media component to another print media component.

DETAILED DESCRIPTION

Figure 1:
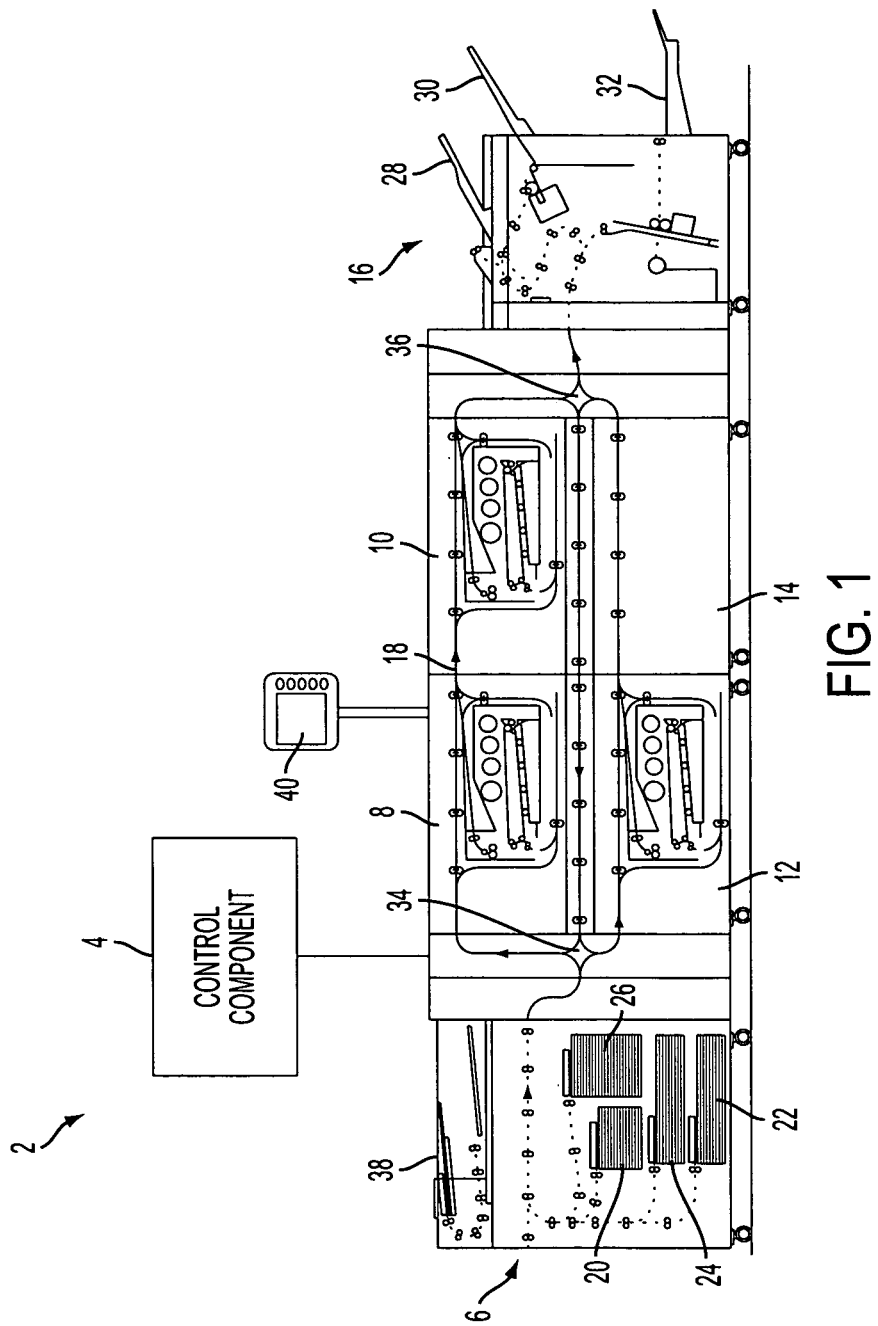
FIG. 1 illustrates an exemplary printing system that can predict impending failures and preemptively redirect jobs to alternate resources.

With reference to FIG. 1, a printing system 2 is illustrated. The printing system 2 includes a controller or control component 4 that controls the components of the printing system 2 and manages print jobs. For example, the control component 4 invokes component warm-up routines when power is cycled on or when the printing system 2 transitions from a lower power (e.g., a sleep) mode to a higher power (e.g., printing) mode. In another example, the control component 2 loads software, firmware, applications and the like. In another example, the control component 2 directs print jobs to one or more print engines. In yet another example, the control component 4 can track the performance history of and predict the health of individual components of the printing system 2. Based on the predicted health of the components, the control component 4 continues controlling the system 2 with an executing control strategy or begins controlling the system 2 under a new control strategy. For instance, the control component 4 may predictably deem a component (e.g., a developer, a fuser, a transferor, a charger, a cleaner . . . ) unhealthy or soon-to-be unhealthy. The control component may then redirect the unprocessed portions of the print job currently in progress or future jobs to alternate redundant components in the printing system that possess similar capabilities as the component that is predicted to be unhealthy. Alternately, the control component 4 may predict when the impending unhealthy component will be capable of performing at a reduced capacity and/or with reduced functionality. The control component 4 can accordingly adjust its control strategy to leverage the impending reduced set of capabilities and timing of the predicted unhealthy component to at least partially process jobs. It is to be understood that the foregoing examples are provided for explanatory purposes and are not all-inclusive or limitative; the control component 4 can control more, less, similar and/or different operations of the printing system 2.

The control component 4 can control a plurality of processing units 6, 8, 10, 12, 14, 16 that are coupled through a print media conveyor. The processing units 6, 8, 10, 12, 14, 16 cooperate to process print jobs at a relatively high rate. While this example illustrates six processing units, it is to be understood that the printing system 2 can include N processing units, where N is an integer equal to or greater than one.

One or more of the processing units 6, 8, 10, 12, 14, 16 can be removable. For example, the functional portion (e.g., marking engine) of the processing unit 14 is absent from the printing system 2, leaving a housing or mounting fixture through which a print media conveyor or transport paper path 18 passes. In this manner, the functional portion of any of the processing units 6, 8, 10, 12, 14, 16 can be removed for repair or replaced to effectuate an upgrade, modification and/or repair of the printing system 2. The printing system 2 remains operational with the functional portion of the processing unit 14 removed, malfunctioning, faulty, broken, or otherwise unavailable, with some loss of the overall printing functionality.

Some or all of the processing units 8, 10, 12, 14 may be identical to provide redundancy or improved productivity through parallel printing. Alternatively or additionally, some or all of the processing units 8, 10, 12, 14 may be different to provide different capabilities. For example, the processing units 8 and 10 may include color marking engines, while the processing unit 12 includes a black (K) marking engine. Suitable marking engines include electrophotographic printers, ink-jet printers, including solid ink printers, thermal head printers that are used in conjunction with heat sensitive paper, and/or other devices capable of marking an image on a substrate. The marking engines may be of the same or different modalities (e.g., black (K), custom color (C), process color (P), or magnetic ink character recognition (MICR) (M)). In addition, the marking engines may be capable of generating more than one type of print modality, for example, black and process color.

In addition, the processing units 8, 10, 12, 14 can be stacked vertically and/or horizontally to form a tandem, parallel and/or cluster printer for simplex, duplex and/or multi-pass printing. The processing units 8, 10, 12, 14 can employ xerographic printing technology, in which an electrostatic image is formed and coated with a toner material, and then transferred and fused to paper or another print medium by application of heat and pressure. However, processing units employing other printing technologies can be employed as processing units, such as processing units employing ink jet transfer, thermal impact printing, or so forth.

The control component 4 of the printing system 2 can predict unhealthy components based on system measurements and/or is notified of impending changes to such components by a user. For instance, the controller can continuously monitor the system and track key performance variables, or it can run diagnostic routines to measure key values (e.g., run time for consumables monitoring, current, voltage, impedance, inductance, capacitance, temperature, etc.) that are predictive of a status or pending health of various components and sub components of the printing system 2. For example, the control component 4 can measure runtime by a marking engine during use. In another example, the control component 4 can track sensor and/or actuator values, error logs, fault and error counters, registers, component usage, history logs, etc. to facilitate predicting impending unhealthy components. Such sensors can include those that are traditionally used in printing systems such as for example toner area coverage sensors, paper path jam sensors and so on, as well as specialized sensors for fault prediction. For example, the media path may include, specialized motor torque sensors, media type and property sensors, over and beyond the jam sensors and the encoders, and homing sensors traditionally used. In printing systems which include imaging sensors positioned proximate a transfer belt or drum or in connection with a path extending from a marking module, the imaging sensors can collect information predictive of the print quality to detect streaks, spots, color gamut, glossiness, etc. Examples of actuator signals that can be used for fault prediction include xerographic actuators such as development bias, exposure level, and charge levels. The Raster Output Scanner (ROS) intensity level can be monitored in systems where ROS intensity modulation is used as an actuator for banding control wherein excessive modulation implies faults or impending problems in the system. A toner reproduction curve (TRC) map can be used as an actuator for TRC based control in some systems wherein the actuation reaching upper or lower limits indicates that the print is more non-uniform than what can be corrected for, thereby, signaling impending faults. Another example of an actuator signal includes a gloss level adjustment in systems equipped with gloss level sensing. In another example, the health of a photoreceptor may be adequately inferred from an analysis of the photo induced discharge curve (PIDC) parameters stored in the non-volatile memory (NVM). In other instances, a user observes diminishing image quality (e.g., diminished gloss, streaks, spots . . . ), and the user provides the control component 4 with information regarding the impending image quality.

Based on measurements such as the above, the controller 4 can employ various fault detection/prediction schemes to assess the health state of component. One simple but effective fault prediction scheme involves checking the fault and error counters for abnormally higher values or higher rate of fault occurrences. For example, the rate of fault occurrences may be checked against (customer settable) thresholds. Threshold checks on the sensors in the system, as well as time based checks can also be used to predict failures. Alternately, actuator values can be compared to established process control limits and significant deviations from normal, i.e. anticipated actuator values, both in magnitude and direction can provide a good indication of impending problems. Such monitoring can include identifying how frequently the compensation schemes are being activated, how much compensation is provided (i.e., how much the actuator values deviate from nominal values), trends, and variations in the actuator signals.

Upon predicting component health status, the control component 4 can preemptively determine whether the processing units 6, 8, 10, 12, 14, 16, or a portion thereof, will be able to continue processing jobs and when the health status is likely to change. For instance, in one example, the controller 4 may have predicted an impending problem with the processing unit 14 or the user may have notified the control component 4 of an impending problem with the processing unit 14. For example, the processing unit may be trending toward a control limit threshold or fault condition. The controller may then preemptively redirect jobs from the impending unhealthy component to an alternate or redundant resource based on, for example, rate of failures. Moreover, the switch doesn't necessarily have to be to a low productivity mode. The redundant element may be an alternate marking engine, a paper tray, an inverter, a destination and the like. The controller can, for example, switch to an alternate print engine if fuser or transfer jam rates, or registration errors exceed thresholds. The fault/error counter based prediction and redirection will be especially useful and implementable for paper path failures including misfeeds and multifeeds. For example, the controller can change its control strategy to switch to alternate trays when rate of misfeeds and/or multifeeds from a tray is greater than a threshold.

When the controller 4 implements the predictive redirection strategy, faults can be anticipated or predicted, and jobs can be switched to an alternate redundant resource preemptively rather than wait until the fault develops to a point where the unhealthy component is required to be taken out of service immediately. It is to be appreciated that fault management is not merely recovery from fault and continued operation, but includes the ability to mitigate severe customer dissatisfaction in cases such as, for example, repeated jams. In the case of a problem that repeatedly causes jams to occur, repeated transitions to and from low gear modes as well as repeated customer interventions to clear the jam can be a major source of dissatisfaction. In these cases, not only is the overall system productivity enhanced due to reduced intervention times, it is also highly advantageous from a customer interaction and operability point of view if the fault can be predicted and preemptive redirection can be achieved.

The controller 4 may, in addition to redirecting jobs to alternate resources, determine when the problem will be severe enough that the processing unit 14 will have to be repaired or replaced, and may further initiate a service call to do the necessary repair. This ensures that the appropriate repair action can be taken as early as possible to avoid a reduced production mode, customer intervention, or to restore the machine to a fully functional state.

It is to be appreciated that the switch to an alternate resource, especially one that reduces the system throughput and capabilities such as a switch to a "low gear mode" or "low productivity mode" can have provisions for customer overrides, i.e., customers who wish to avail of these high availability options may do so whereas, those who do not find these acceptable can disable these options. Such an option may be attractive especially to customers running jobs in scenarios where the throughput is less critical than intervention rate (for example, when it may not be possible or desirable to have an operator available). Moreover, the threshold for switching to an alternate resource or switching to a different mode may itself be made customer settable.

Alternatively, the control component 4 may have preemptively determined when the processing unit 14, although not predicted to be able to fully perform for a print job, would be able to operate at a reduced capacity or capability. For example, a predicted unhealthy fuser (not shown) associated with the processing unit 14 will only be able to print jobs with a relatively reduced gloss. Rather than disabling or by-passing the processing unit 14, the control component 4 can use the processing unit 14 to process jobs with less gloss requirements, wherein jobs with high gloss requirements can be re-routed to processing units with predicted fully functioning fusers. In another example, a predicted impending unhealthy print engine (not shown) may foreseeably not be able to process a color (e.g., due to an impending failing developer). Rather than disabling or by-passing the processing unit 14, the control component 4 can use the processing unit 14 to process jobs that do not include the color associated with the impending failed developer or partially process jobs that include at least one color associated with an operational developer and at least one color associated with the failed developer. In another example, a charger, a developer, a transferor, a cleaner and/or a fuser of any of the processing units 8, 10, 12, 14 may be trending towards an unhealthy status such that the printing system 2 begins to reproduce images at a level approaching less than desired image quality. Such processing unit may be able to be used to process less stressful jobs such as text only jobs or jobs with relatively low area coverage without perceptible loss in image quality. For example, a printing engine that predictively will be trending towards charge deficiencies may still continue to print text without a visible defect. Pending jobs requiring higher image quality, such as graphics, can be scheduled and redirected to processing units with fully operational components.

Thus, an impending unhealthy component may still be able to process certain jobs for a period without limitation and then process other remainder, and/or unprocessed portions of jobs if those jobs do not require the predicted unavailable features or performance levels. Therefore, whenever the fault is of a nature that will render loss of some capabilities or reduced performance, the component can still be used to process jobs that do not need these capabilities or that will not be compromised by the reduced performance. Jobs that need the predicted unavailable capabilities or require a higher level of performance can be be re-routed preemptively to redundant healthy components or partially processed by the predicted unhealthy component and partially processed by a healthy component. Thus, rather than by-passing or disabling a predicted unhealthy component of the printing system 2, the controller 4 predicts the capabilities of the unhealthy component and leverages such capabilities to improve performance and throughput and increase availability relative to conventional systems that by-pass or disable unhealthy components.

It is to be appreciated that redirecting jobs can be through various techniques such as automatic (without human assistance and/or intervention), manual (human invoked), and/or a combination thereof (e.g., where the controller determines a job should be redirected and the human initiates the redirection).

The processing unit 6 can be a print media source processing unit that supplies printing media substrate for printing, and the processing unit 16 can be a finisher that provides finishing capabilities such as collation, stapling, folding, stacking, hole-punching, binding, postage stamping, or so forth. The print media source processing unit 6 can include print media sources 20, 22, 24 and 26 connected with the print media conveyor 18 to provide selected types of print media. While four print media sources are illustrated, K print media sources can be employed, wherein K is an integer equal to or greater than one. Moreover, while the illustrated print media sources 20, 22, 24, 26 are embodied as components of the dedicated print media source processing unit 6, in other instances one or more of the marking engines may include its own dedicated print media source instead of or in addition to those of the print media source processing unit 6.

Each of the print media sources 20, 22, 24, 26 can store sheets of the same type of print medium, or can store different types of print media. For example, the print media sources 22 and 24 may store the same type of large-size paper sheets, print media source 20 may store company letterhead paper, and the print media source 26 may store letter-size paper. The print media can be substantially any type of medium upon which one or more of the processing units 20, 22, 24, 26 can print, such as: high quality bond paper, lower quality "copy" paper, overhead transparency sheets, high gloss paper, and so forth.

The print media conveyor 18 is controllable by the controller 4 to acquire sheets of a selected print medium from the print media sources 20, 22, 24, 26, transfer each acquired sheet to one or more of the processing units 8, 10, 12, 14 to perform selected marking tasks, transfer each sheet to the finisher 16 to perform finishing tasks according to a job description associated with each sheet and according to the capabilities of the finisher.

The finisher unit 16 can include one or more print media destinations 28, 30, and 32. While three destinations are illustrated, the printing system 2 can include X print media destinations, where X is an integer greater than or equal to one. The finisher unit 16 deposits each sheet after the processing in one of the print media destinations 28, 30, 32, which can include trays, pans, etc. While only one finisher is illustrated, it is contemplated that two, three, four or more finishers can be employed in the printing system 2.

The print media conveyor 18 can pass through each of the processing units 8, 10, 12, 14 to provide a bypass route in which the sheets can pass through the processing units 8, 10, 12, 14, 16 without interacting therewith. Branch paths are also provided in each processing unit 8, 10, 12, 14 to take the sheet off the conveyor 18 and into the functional portion of the processing units 8, 10, 12, 14 and to deliver the processed sheet back to the conveyor 18. In the processing unit 16, the branch paths are presently removed along with the functional portion; however, the bypass portion of the conveyor 18 remains in the processing unit 16 so as to maintain continuity of the print media conveyor 18. The conveyor 18 may also include other branch junction points, such as, for example, the branch junction points 34 and 36 to enable the conveyor to pass sheets along selected paths in the illustrated multiple-path conveyor configuration. This provides the illustrated arrangement in which the marking engine processing units 8, 10, 12, 14 are arranged two-dimensionally. In a linear arrangement of processing units (not illustrated), the branch junction points 34 and 36 are suitably configured.

The printing system 2 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets. The printing, finishing, paper-handling, and other processing operations that can be executed by the printing system 2 are determined by the capabilities of the processing units 6, 8, 10, 12, 14, 16, 18 of the printing system 2. Those capabilities may increase over time due to addition of new processing units or upgrading of existing processing units. Those capabilities may also decrease over time due to failure or removal of one or more processing units, such as the illustrated removed functional portion of processing unit 14.

Print jobs can be supplied to the printing system 2 in various ways. A built-in optical scanner 38 can be used to scan a document such as book pages, a stack of printed pages, or so forth, to create a digital image of the scanned document that is reproduced by printing operations performed by the printing system 2. Alternatively, a print job can be electronically delivered to a system controller (not shown) via a wire or wireless connection by a remote device such as another print platform, a computer, etc. For example, a network user operating word processing software running on a remote computer may select to print the word processing document on the printing system 2, thus generating a print job, or an external scanner (not shown) connected to the network may provide the print job in electronic form. It is also contemplated to deliver print jobs to the printing system 2 in other ways, such as via CD, DVD, optical disk, magnetic tape, flash memory, etc., or using a dedicated computer connected only to the printing system 2.

An interface 40 provides a mechanism for interaction between the printing system 2 and a user. The interface 40 displays various menus and enables the user to configure the printing system 2 and/or print jobs. The user interacts with the user interface 40 to navigate through menus, select options, configure the printing system 2, activate a particular function in connection with a multi-functional platform (e.g., print, copy, scan . . . ), retrieve messages, etc. By way of example, a user desiring to produce several copies of a document can interact with the user interface 40 to activate a copy menu, input a number of copies, define paper type (e.g., letter, A4 . . . ), set print quality (e.g., resolution) and color (e.g., grey scale, color . . . ), etc. This information is provided to the control component 4, which executes instructions to produce the copies based on the user input. As described previously, the control component 4 also controls various other aspects of the printing system 2 such as warm up routines, transitions into and out of low power inactivity modes, loading software, firmware and applications, routing print jobs to the processing units 8, 10, 12, 14, etc.

The printing system 2 is illustrative. In general, any number of print media sources, media handlers, marking engines, collators, finishers or other processing units can be connected together by a suitable print media conveyor configuration. While the printing system 2 illustrates a 2×2 configuration of four marking engine processing units or image marking engines (IME) 8, 10, 12, 14, buttressed by the media source unit 6 on one end and by the finisher unit 16 on the other end, other physical layouts can be used, such as an entirely horizontal arrangement, stacking of processing units three or more units high, or so forth. Moreover, while in the printing system 2 the marking engine processing units 8, 10, 12, 14 have removable functional portions, in some other embodiments some or all processing units may have non-removable functional portions and/or field replaceable units. It will be appreciated that even if the functional portion is non-removable, the provision of the print media conveyor 18 with bypass paths through each intermediate processing unit enables the processing unit to be taken "off-line" for repair or modification while the remaining processing units of the printing system continue to function as usual.

In some aspects, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some aspects the printing system may be a cluster of networked or otherwise logically interconnected printers each having its own associated print media source and finishing components.

The plurality of processing units 6, 8, 10, 12, 14, 16 and flexible print media conveyor 18 enables the printing system 2 to have a large number of capabilities and features. Each marking engine 8, 10, 12, 14, for example, has associated low-level print settings such as xerographic voltages, fuser temperatures, toner reproduction curves (TRC), and so forth. Some of these low-level print settings are optionally modified depending upon the sequence along which a given sheet passes through the printing system 2; for example, it may be advantageous to modify the fusing temperatures of serially performed xerographic processes. At a higher functional level, each marking engine has associated functional parameters such as contrast, resolution, and so forth.

Typically, the user has certain user preferences regarding performance of the printing system 2. The user ideally wants a highly efficient or productive printing (that is, a high throughput of sheets and print jobs through the printing system 2), high printing quality, image quality consistency across each print job, and so forth. At the same time, the user typically wants the printing system 2 to maintain high reliability (that is, minimize the down-time of the printing system 2), low run cost (achieved, for example, by minimizing cycling of processing units between idle and active states), low service costs (achieved, for example, by distributing usage of consumable elements across similar processing units), high energy efficiency, and so forth.

Figure 2:
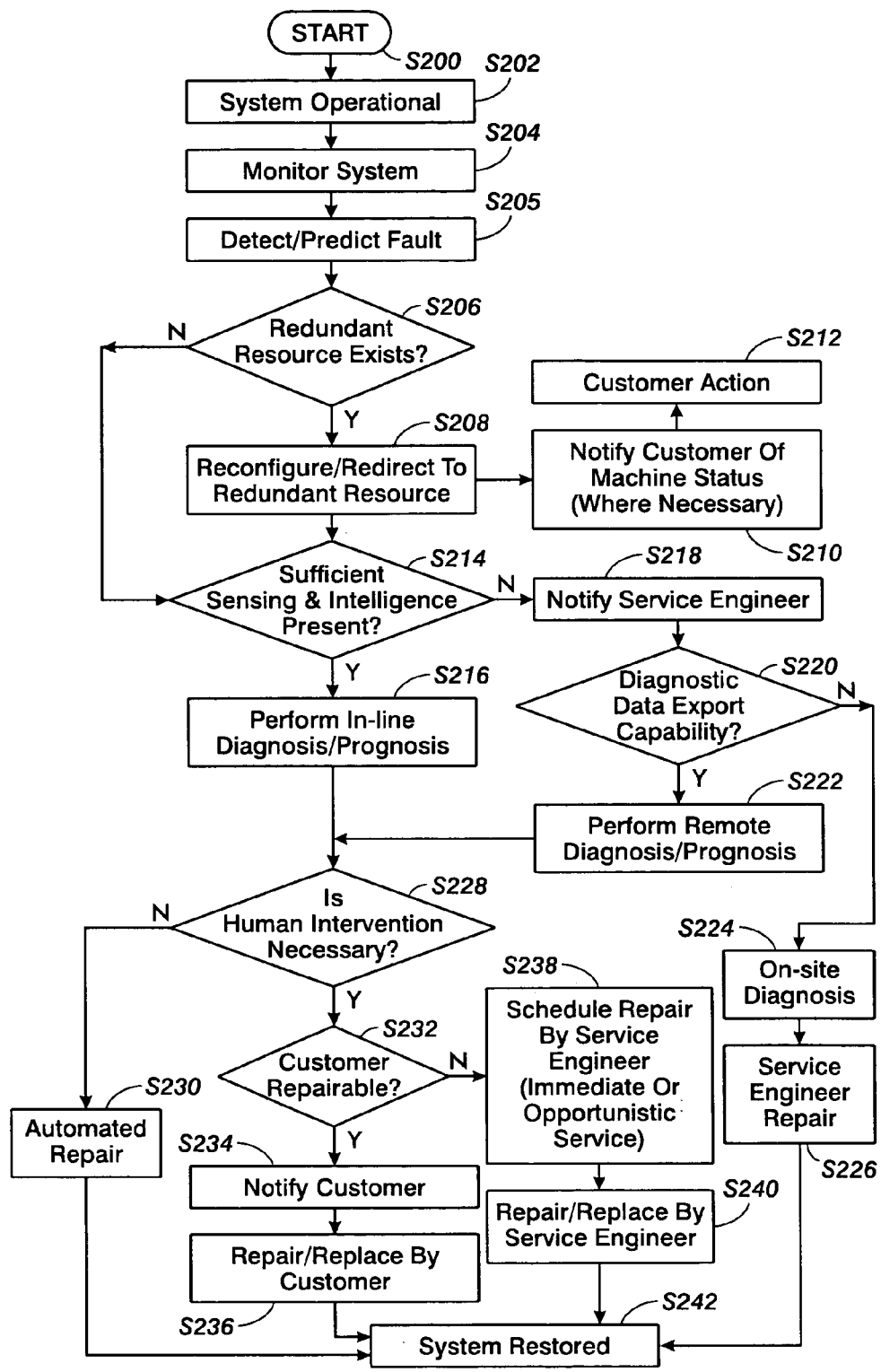
FIG. 2 illustrates an exemplary methodology for using a self-diagnosed impending unhealthy component of a printing system and preemptive redirection to process at least a portion of a job; and, FIG. 3 illustrates an exemplary printing system with a centralized fault management system supporting fault prediction and preemptive redirection

With reference to FIG. 2, a methodology for predicting faults and preemptively reconfiguring a print system and/or preemptively redirecting print jobs is illustrated. It will be appreciated that the method may include fewer, more, or different steps and that the steps need not be performed in the order specified. The method begins at S200. For purposes of discussion, it will be assumed that the printing system 2 is fully operational S202, although in a continuously operating system, this need not be the case. At S204, the operating modules of the printing system are monitored. Such monitoring may involve running self-diagnostics, tracking and trending fault and error counters, error logs, history logs, component usage, sensor values, actuator values, At S205, the impending unhealthy state of a component is predicted as for example, by comparisons of the above data against threshold limits. When a fault is predicted, the controller 4 can check to determine if redundant resources exist S206. If a redundant resource is available, the controller can then redirect or reconfigure the remaining jobs or portions of jobs to the redundant resource. Examples of redundant resources include marking engines, media trays, inverters, finishers and the like. Alternately, the controller 4 may determine the capabilities of the impending unhealthy component. If it is predicted that the processing unit associated with the unhealthy component can process the job, then the processing unit processes the job. On the other hand, if the impending fault will be of a nature that renders loss of some capabilities or reduced performance, the component can still be used to process jobs that do not need these capabilities or that will not be compromised by the reduced performance. Examples of reduced capability modes include partial color capability (e.g., monochrome only), and capability for printing only less stressful jobs (e.g., text only, low area coverage, less stressful media, or lower gloss requirements).

At step S210, the customer or other operator may be notified of the machine status, which may result in a customer action S212. Whether or not redundant resources exist, the method proceeds to S214. At S214, controller 4 determines whether sufficient sensing and processing capabilities exist in the system for more detailed fault diagnosis. If so, it performs diagnosis/prognosis S216. If not, a service engineer or a remote fault diagnosis agent is notified. The service engineer/remote diagnosis agent may request export of data from the printing system. If this capability exists S220, the service engineer or remote diagnosis agent performs remote diagnosis on the exported data and communicates a diagnosis/prognosis to the controller 4 S222. In the event that there is no capability for exporting data, or the data is insufficient for a remote diagnosis, an on-site diagnosis may be performed by the service engineer S224, resulting in a repair S226.

If automated diagnosis by the controller or remote diagnosis determines that human intervention is not necessary S228, an automated repair may be performed S230. This may include resetting actuators for the operational components (e.g., adjusting fuser operating temperatures, electrical power to the charging corotron or transfer corotron, adjusting nip roller speeds or nip gaps, and the like), adjusting tone reproduction curves, etc to remove the fault or to mask defects caused by the fault. In the case where human intervention is determined to be required S232, the controller may determine whether the fault is customer repairable or requires a service engineer. If the fault is determined to be customer repairable S234, the customer is notified. The customer (or other local user) may effect a repair, e.g., by replacement of a customer repairable unit (CRU). The customer may perform other repairs based on specific information as to the determined root cause of the fault S236. If the fault is not customer repairable, then a repair by a service engineer is scheduled S238, who may effect a repair S240. This repair action may be scheduled immediately following the failure or at an opportune time based on customer preferences and/or economics. Due to the modular arrangement of the integrated printing system, the repair or replacement by the operator or service engineer can include a hot repair, i.e. repair or replacement while the other resources are still operating. The system can be restored to its operational state S242 through repairs made at steps S230, S236, S240 and the method continues as per S202.

As will be appreciated, by predicting failures and leveraging the available redundancy in the printing system as well as the ability to process jobs with reduced functionality of unhealthy components, the overall system performance and throughput are improved while decreasing user intervention relative to conventional systems that by-pass or disable unhealthy components. The methodology of FIG. 2 not only provides for higher availability of the printing system but also reduced service costs by the use of automated diagnosis and automated repair where possible in the place of diagnosis and repair by a service engineer.

The method illustrated in FIG. 2 can be implemented in a computer program product that may be executed on a computer. The computer program product may be a tangible computer-readable recording medium on which a control program is recorded, or may be a transmittable carrier wave in which the control program is embodied as a data signal.

Figure 3:
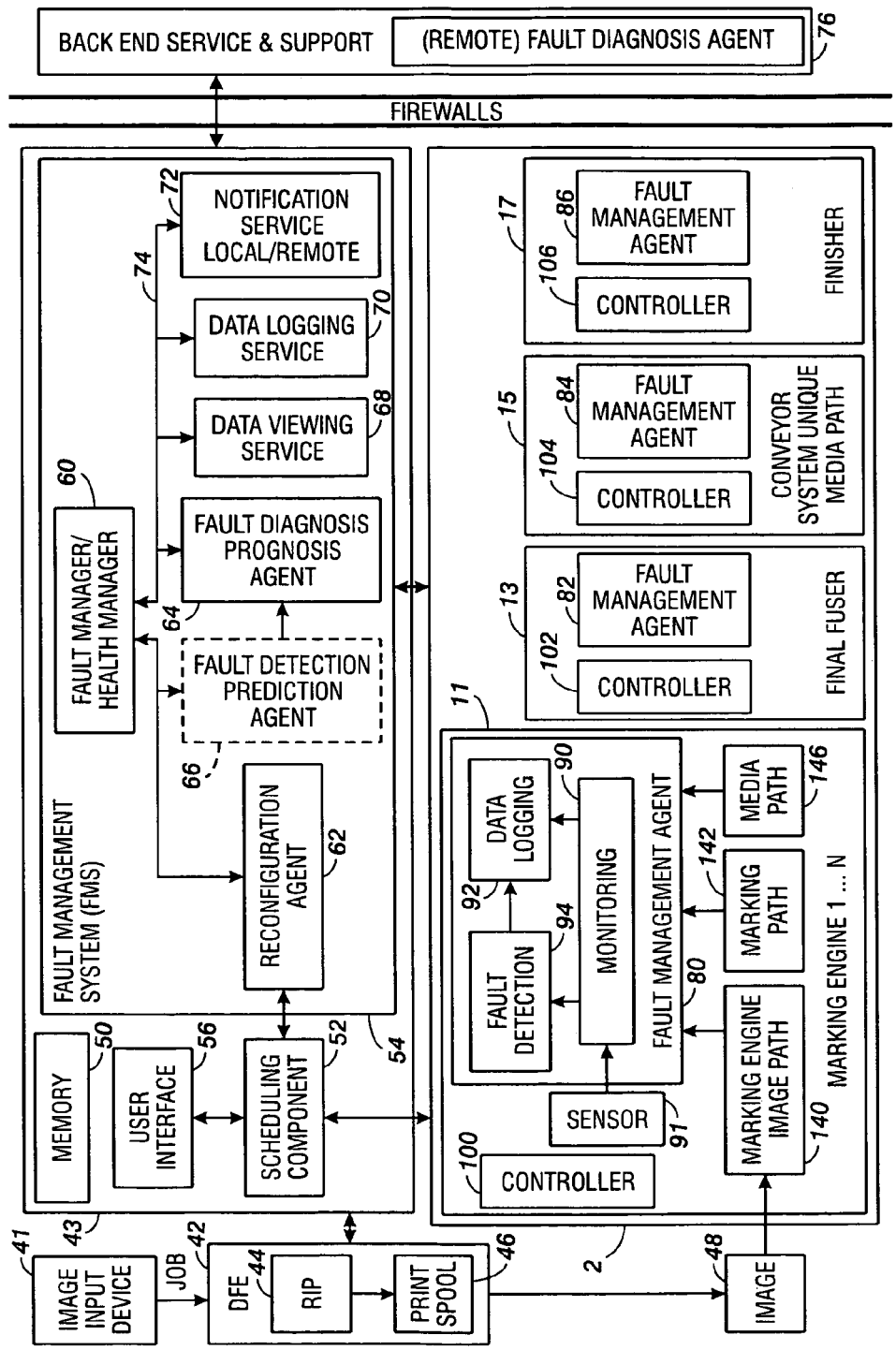

With reference to FIG. 3, a methodology for using a component of a printing system deemed unhealthy by a user to process at least a portion of a job is illustrated. A digital front end (DFE) 42 is shown interfacing with a program and system information protocol (PSIP) 43. At 60, a fault manager predicts when a component will be unhealthy, fail, malfunction, etc. For example, the user may notice a declining output image quality such as streaks, spots, color gamut, glossiness, etc. At 62, the fault manager notifies the controller/scheduler 52 of such trend in image quality, for example, through entering information via a user interface or conveying information through a port (e.g., wire/wireless network, serial, infrared, etc.).

With reference again to FIGS. 1 and 3, an exemplary printing system 2 capable of performing fault prediction and preemptive redirection detection of faults is illustrated. The printing system 2 can include a plurality of print media processing modules 12, 13, 15, 16 and a print station interface platform 43, which serves as a control system, in communication with the processing modules. The illustrated processing modules include a marking engine 12 (representative of a plurality of marking engines 1-N, where N can be, for example, 2, 4, 6, 8, or more); an optional final fusing component 13 which provides a secondary fusing to sheets which have been at least partially fused by a marking engine 8, 10, 12, 14, a print media conveyor system 15, and an output destination 16, such as a finisher. Modules 12, 13, 16 can be interconnected by the print media conveyor system which is fed with print media by a print media source 6. The print media conveyor can be controllable to acquire sheets of a selected print medium from the print media source 6, transfer each acquired sheet to one or more of the installed marking engines to perform selected marking tasks, and then transfer each sheet to the finisher 16 to perform finishing tasks. The finisher 16 includes one or more print media output destinations 28, 30, 32, herein illustrated as trays. While three output destinations 28, 30, 32 are illustrated, the printing system 2 may include one, two, three, four, or more print media output destinations.

An image input device 41 such as a built-in optical scanner or a digital image input device supplies the printing system 2 with one or more print jobs to be printed. The incoming print jobs may be processed, in conventional fashion, by a digital front end (DFE) 42 having raster image processing (RIP) and print spooling capabilities 44, 46. Image data 48 from the DFE is sent to a selected marking engine or engines 11 for printing according to a schedule determined by the control system 43.

The illustrated control system 43 includes data processing components for scheduling print jobs and for detection and diagnosis of faults and responding to faults when detected. The various data processing components execute instructions stored in memory 50. In the illustrated embodiment, the data processing components include a scheduling component 52 and a fault management system 54. It is to be appreciated that while several processing components (and sub-components) are illustrated, it is contemplated that the functions of two or more of the processing components/subcomponents may be combined in a single chip or that functions of a single component may be distributed throughout the system 2. The processing components may reside in a single location or be distributed throughout the printing system. Indeed, some of the processing components may be resident in one or more of the marking engines. Some or all of the data processing components, such as components 52, 54, or parts thereof, may be under the control of a common printing system controller (not shown).

The scheduling component 52 identifies one or more marking engines 8, 10, 12, 14 for performing a particular print job and, as the print job reaches the front of the print job queue, plans a route for each page to be printed. The image(s) for the page are then sent to the selected marking engine and the readiness of the selected print media processing modules 11, 13, 15, 17 confirmed. The scheduling component 52 communicates with the fault management system 54 to identify reconfigurations in the system resulting from any print media processing module failures. The scheduling component may also take into consideration user preferences, input, for example, by a user interface 56, such as a touch screen, keyboard, or the like. The user interface allows users to input their preferences to the scheduling component, such as for example which criteria are most important to them, i.e., run cost, productivity, etc. This preference will be used in conjunction with the information provided by the fault management system 54 to determine the appropriate schedule.

The illustrated fault management system (FMS) 54 includes a number of sub-components which serve to identify faults in the print media processing modules, provide information on the faults to external support service, and reconfigure the printing system at least in the interim while permanent repairs or replacements are being effected. In particular, the FMS 54 includes a fault manager 60, a reconfiguration agent 62, a fault diagnosis/prognosis agent 64, which may incorporate or communicate with a fault detection/prediction agent 66, a data viewing service 68, a data logging service 70, and a notification service 72, all of which may be linked by a data/control bus 74. The FMS, or components thereof, may communicate with an external service and support service 76, The fault manager 60 provides overall control of the fault management system. The fault manager may notify the reconfiguration agent when a fault is detected by the fault detection/prediction agent 66 or a diagnosis is made by the diagnosis/prognosis agent. The centralized fault detection and prediction agent 66, working on data provided by the processing modules, can identify that a fault has occurred or is predicted to occur.

The fault diagnosis (and prognosis) agent 64 uses the information provided by the fault detection (and prediction) agent 66, as well as information that is logged and provided by the individual fault management agents 80, 82, 84, 86, to diagnose the root cause of the detected fault or may identify the cause of a fault which is predicted to occur. The fault recovery functionality is provided by the reconfiguration agent 62 that may be responsible for system reconfiguration and redirection when faults are detected. The reconfiguration agent receives, via the fault manager 60, fault, error, and exception data generated by the modules as well as detection and diagnosis results from the central fault management system. The reconfiguration agent 62 allows the system to reschedule a job and/or redirect jobs to alternate resources when a fault is detected. While the reconfiguration is illustrated as being a part of the fault management system, it may alternatively be a component of the scheduling component 52.

In addition to the central fault management system 54, each of the processing modules 11, 13, 15, 17 in the printing system can include a fault management agent 80, 82, 84, 86. The fault management agent is generally responsible for local monitoring, fault detection, and logging of the status of the module and/or characteristics of the marking materials or print media passing through the module. The monitoring agents 90 may receive data from one or more associated sensors 91. In another embodiment, one or more of the sensors 91 may communicate directly with the fault management agent 80, 82, 84, 86. The fault management agent 80, 82, 84, 86 may also receive direct inputs from the marking engine, such as components which form a part of the image path, marking media path, and print media path, illustrated generally at 140, 142, and 146, respectively. The image path 140 includes the components of the marking engine associated with manipulation of the image prior to marking. The marking media path 142 includes the components of the marking engine associated with forming, transferring and optionally fusing images to print media. The print media path 146 includes those components of the marking engine which are associated with media handling, such as the conveyor system 15, including paper feeder, paper path, and associated drives.

The fault management agent 80, 82, 84, 86 may also include a data logging component 92, comprising memory for logging sensed information from the sensors 91 on a continuous basis along with time stamps. Additionally, the fault management agent may include a fault detection unit 94 for providing preliminary analysis of the logged information. The preliminary analysis may include detection or prediction of a fault in the respective module 11, 13, 15, 17, based on the logged information from that module. The preliminary analysis may also include preliminary diagnosis of the cause of the fault, to the extent possible with the limited information and processing capability which may be available in the fault detection unit. Fault detection and prediction schemes which may be performed by the fault management agent may include time-out checks, threshold checks, trend and rate analysis output/setting comparisons between similar units in the system, checking the actuator and sensor signals for significant deviations from normal, both in magnitude and in frequency, as well as identifying how frequently various compensation schemes in the print processing module are activated, and how much compensation is required to be provided. Additionally, fault detection and prediction may involve checking the fault counters and error counters for abnormally high values, or a higher than normal rate of change.

The fault management agent 80, 82, 84, 86 thus provides a first level fault detection and prediction for the printing system which may be sufficient to enable printing system to perform redirection and reconfiguration, at least on an initial basis, until a more detailed fault detection can be performed by the centralized fault management system 54. The results of the fault detection may also be logged by the logging component 92 in the fault management agent.

The fault management agent 54 may communicate with a controller 100, 102, 104, 106 for the module. The controller may be resident in the respective module 11, 13, 15, 17, as illustrated, or be remote there from. The controller 100, 102, 104, 106 may adjust settings for the module 11, 13, 15, 17 with which it is associated in response to information from the respective fault management agent 80, 82, 84, 86. For example, the controller 100 for the marking engine 12 may adjust power to the fuser in response to fuser roll temperatures outside a predetermined range or sensed gloss values outside a predetermined range.

The individual fault management agents 80, 82, 84, 86 also communicate information (i.e., some or all of the fault related data) to the FMS 54. The information communicated to the FMS 54 may be in the form of unprocessed, logged, time stamped, and/or processed data, e.g., information output by the fault detection unit 94 concerning a perceived fault.

The reconfiguration agent 62 is responsible for determining the system reconfiguration and redirection schema when faults are detected or predicted. The reconfiguration agent receives information on the faults detected/diagnosed by the individual printing system modules as well as detection and diagnosis results from the central fault management system FMS. The reconfiguration agent 62 may enable the printing system to reschedule upcoming jobs and also the current job when a fault is detected. Reconfiguring the printing system may include one or more of: redirecting print jobs to another marking engine or another media source, switching over to a physically or functionally redundant sub-system module when one is faulty, or restricting use of a module for specific tasks only. It may also involve instructing one or more of the modules to modify operating parameters. The reconfiguration agent 62 determines which of these action or actions are to be taken when a fault is detected. While the reconfiguration agent is illustrated as being a part of the fault management system, it may alternatively be a component of the scheduling component 52 as discussed below with reference to FIG. 3.

The status of the operating modules, as determined by the fault detection agent 66 and fault diagnosis agent 64, as well as the recommendations by the reconfiguration agent 62, are communicated to the scheduling component 52, so that the reconfiguration actions can be effected by the printing system 2.

The data logging service 70 continuously logs the data received from the processing modules as well as the fault detection agent 66, the fault diagnosis agent 64, and the reconfiguration agent 62. The data viewing service 68 allows a user to review the logged data, either locally or remotely. The notification service 72 communicates with the external service 74, e.g., via the internet or phone line. The notification service may communicate the results of the diagnosis, the appropriate repair actions needed, or to invoke more sophisticated diagnosis capabilities than are available in the FMS which may be provided by the external service.

The fault manager 60 provides overall control of the fault management system and may perform the following functions: (i) coordinate the operation of the various components in the centralized fault management system, as well as the module fault management agents 80, 82, 84, 86; and (ii) convey the results of the centralized detection and diagnosis services 64, 66 and the reconfiguration agent 62 (where separate from the scheduling component) to the scheduling component 52.

In addition to passive collection of data, the FMS may have the capability to initiate the collection of specific data which will be used in identifying a fault. For example, the FMS may run system level tests in which specific marking engines may be queried and exercised in specific ways for diagnostic purposes, such as by running a set of marking engines to complete a test print job or by testing the capability of a processing module in isolation from other modules, i.e., without interactions of the other processing modules. These tests may be initiated by the fault manager 60 or by a separate printing system controller (not shown) at the request of the FMS.

The FMS 54 may also serve as a health management system in that it can accurately predict future failures and use this information, along with the usage history and failure history of printing system components, to determine appropriate actions for maintaining the printing system in a healthy state. The actions may include reconfiguring the printing system to minimize use of a processing module which is predicted to fail, reserving processing modules (or components thereof that are needed for an upcoming job from being used for jobs for which there are other processing module choices based on their current and predicted health, and the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system, comprising
a plurality of print processing modules which selectively transfer print media therebetween during printing;
said print processing modules includes at least two marking engines for selective said printing;
wherein same said print media moves from one of the at least two marking engines selectively to another of the at least two marking engines;
a controller that predicts an impending unhealthy state of at least one module and redirects at least one of an unprocessed job or a partially processed job preemptively from an impending unhealthy module to selectively a healthy module and another unhealthy module, with suitable capabilities, to process unprocessed portions of the at least one of an unprocessed job or a partially processed job; and,
wherein the controller determines when the capabilities of the at least one module will reach the predicted diminished capabilities of the at least one module, prior to reaching the predicted diminished capabilities of the at least one module.

2. The printing system of claim 1, wherein the controller uses capabilities of the at least one module to process a job until the at least one module is predicted to be unhealthy and then uses the at least one module to process jobs requiring only predicted diminished capabilities of the at least one module.

3. The printing system of claim 1, wherein the controller tracks and trends data selected from one or more of fault counters, error counters, parts usage counters, sensors, process loop actuators, service history and user input associated with the plurality of print processing modules, and compares the data to predetermined threshold limits to predict the impending unhealthy state of the at least one module.

4. The printing system of claim 3, wherein the predetermined threshold limits are settable by a user.

5. The printing system of claim 3, wherein the controller executes diagnostics and comparisons to the predetermined threshold limits of resulting diagnostic data to predict the impending unhealthy state of the at least one module.

6. The printing system of claim 3, wherein a sensor measures and tracks at least one of an associated electrical characteristic including at least one of a current, a voltage, an impedance, an inductance, a frequency, a capacitance;
the sensor further measures and tracks at least one of an associated mechanical characteristic including at least one of a motor torque, a speed, and a position; and,
the sensor further measures and tracks at least one of an associated print media characteristic including at least one of a media type, size, thickness, and resistance.

7. The printing system of 1, wherein the at least one of an unprocessed job and a partially processed job is redirected with human intervention, without human intervention, or a combination thereof.

8. The printing system of claim 1, wherein the plurality of print processing modules are independently selected from a group consisting of print media substrate sources, marking engines, conveyor systems, inverters, and finishers.

9. The printing system of claim 8 wherein the system includes multiple marking engines and the controller redirect jobs from an impending unhealthy marking engine to a healthy marking engine.

10. The printing system of claim 8 wherein the controller predicts an impending unhealthy state of the print media substrate sources by tracking a rate of misfeeds and multifeeds and redirects one of an unprocessed job and a partially processed job to selectively another marking engine and another print media substrate source.

11. The printing system of claim 1, wherein the plurality of print processing modules include at least one source that provides a print media substrate, a marking engine, a conveyor system, and a finisher.

12. The printing system of claim 1, wherein the plurality of print processing modules includes marking modules that are in a stacked arrangement according to one of vertically, horizontally, and vertically and horizontally to form one of a tandem, a parallel, and a cluster printer.

13. The printing system of claim 1, wherein the plurality of print processing modules include one or more of an electrophotographic printer, an ink-jet printer, a solid ink printer, and a thermal head printer.

14. The printing system of claim 1, wherein the plurality of print processing modules include one or more of a black, a custom color, a process color, a highlight color, and a magnetic ink character recognition marking engine.

15. The system of claim 1, wherein the system is a xerographic apparatus.

16. The printing system of claim 1, further comprising:
at least a third marking engine;
a print media conveyor to transfer said print media to one or more of the at least three marking engines; and,
wherein said conveyor selectively transfers said print media from a first marking engine to a second marking engine and selectively bypassing a third marking engine.

17. A method of printing comprising:
predicting an impending unhealthy state of one or more capabilities of a printing system having a plurality of modules;
wherein the printing system having one or more capabilities representing diminished capabilities of one or more modules relative to capabilities available when the one or more modules are healthy;

redirecting one of an unprocessed job or a partially processed job preemptively from an impending unhealthy module to selectively a healthy module or another unhealthy module within the printing system, with suitable capabilities, to process unprocessed portions of the unprocessed job or the partially processed job;

wherein said process includes printing;

wherein the one or more modules includes a finishing module wherein all jobs within the printing system terminate at the finishing module;

using all capabilities available of a healthy module to process a job until predicted to be an unhealthy module having predicted diminished capabilities;

using the predicted to be unhealthy module to process jobs requiring only the predicted diminished capabilities of the predicted to be unhealthy module; and, tracking and trending data from one or more of fault counters, error counters, parts usage counters, sensors, and service history associated with one or more modules, and comparing the data to predetermined threshold limits to predict an impending unhealthy state of at least one or more modules, prior to reaching the predicted diminished capabilities of the at least one module.

* * * * *